Figure 1:
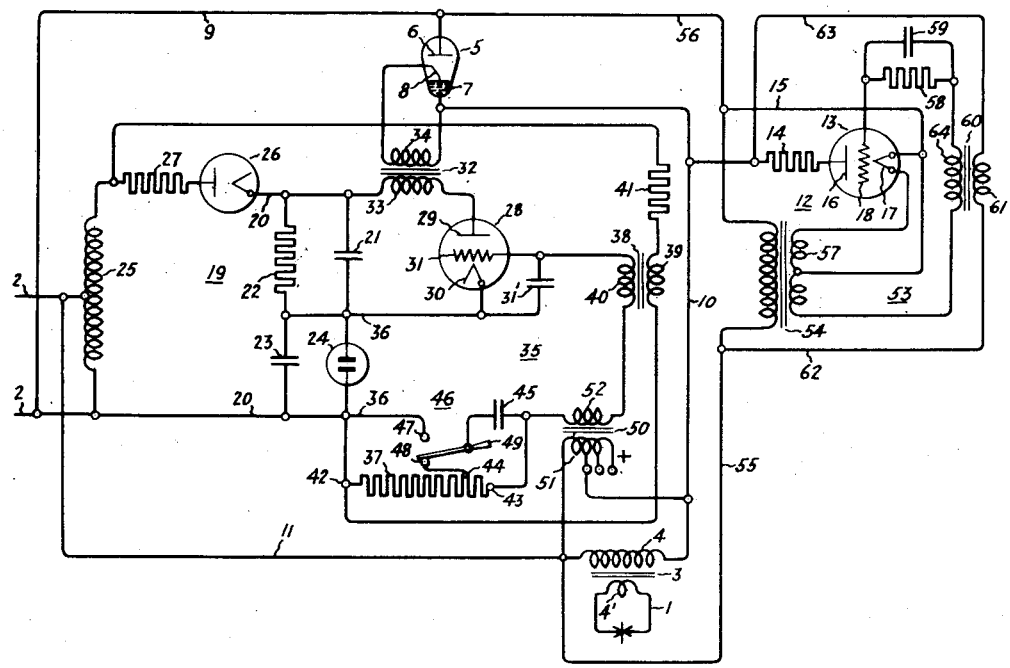

June 14, 1938.  H. W. LORD ET AL  2,120,565
ELECTRIC VALVE CIRCUIT
Filed March 31, 1937   2 Sheets-Sheet 1

Inventors:
Harold W. Lord,
Theodore M. Dickinson,
by Harry E. Dunham
Their Attorney.

June 14, 1938.   H. W. LORD ET AL   2,120,565
ELECTRIC VALVE CIRCUIT
Filed March 31, 1937   2 Sheets-Sheet 2

Inventors:
Harold W. Lord,
Theodore M. Dickinson,
by Harry E. Dunham
Their Attorney.

Patented June 14, 1938

2,120,565

UNITED STATES PATENT OFFICE 2,120,565

ELECTRIC VALVE CIRCUIT

Harold W. Lord and Theodore M. Dickinson, Schenectady, N. Y., assignors to General Electric Company, a corporation of New York Application March 31, 1937, Serial No. 134,048

17 Claims. (Cl. 171—119)

Our invention relates to electric circuits, more particularly to electric valve translating apparatus for effecting energization of a direct current circuit from an alternating current circuit.

In many applications, as for example in welding circuits and in circuits for magnetizing devices where it is desirable to employ unidirectional currents of relatively large magnitude, it has been found expedient to provide these unidirectional currents by employing electric valve translating apparatus energized from an alternating current source. One of the most desirable ways of supplying a load circuit with unidirectional current of appreciable magnitude is to effect energization of a transformer from an alternating current source through an electric valve means and in which the electric valve is rendered conductive for a predetermined interval of time to effect energization of the load circuit for a corresponding interval of time. One of the disadvantages of such arrangements is the reversal of current in the secondary winding of the transformer occasioned by the interruption of the energization of the transformer when the electric valve means is rendered non-conductive. This reversal of current is caused by the decay of flux established in the core member of the transformer. In view of these factors, it has become evident that there is a decided need for improving electric valve apparatus which will supply the desired currents of large magnitude for a predetermined duration, but which will not cause or permit the reversal of current in the secondary winding immediately after the period of conduction or energization.

It is an object of our invention to provide a new and improved electric control system.

It is another object of our invention to provide a new and improved electric valve translating system for supplying a direct current load circuit from an alternating current supply circuit.

It is a further object of our invention to provide a new and improved control or excitation circuit for electric valve apparatus.

In accordance with an illustrated embodiment of our invention we provide an improved electric valve translating system in which a load circuit is energized from an alternating current supply circuit through electric valve means and an associated transformer, and in which the magnetization of the transformer is controlled prior to the period of energization of the load circuit to establish in the transformer a flux of sufficient magnitude to prevent reversal of the current in the secondary winding after the period of conduction or energization. More particularly, an electric valve means is connected in series relation with a primary winding of the transformer to supply unidirectional current to the primary winding during a positive half cycle of voltage of the source and to supply a unidirectional current of relatively large value to the load circuit during the corresponding period. A second electric valve means is connected reversely in parallel with the first electric valve means to effect energization of the primary winding prior to and in the opposite direction to that effected by the first electric valve means to establish in the core member of the transformer a magnetic flux of sufficient magnitude to prevent reversal of the current in the secondary winding when the period of energization of the load circuit terminates.

In accordance with another embodiment of our invention, we provide an improved control or excitation circuit for the first electric valve means whereby this electric valve means is controlled so that it effects energization of the load circuit during only one half cycle of applied voltage, and whereby the second electric valve means is maintained nonconductive for a predetermined interval of time after the period of conduction of the first electric valve means, or, in other words, after the period of energization of the transformer.

For a better understanding of our invention, reference may be had to the following description taken in connection with the accompanying drawings and its scope will be pointed out in the appended claims. Fig. 1 of the accompanying drawings diagrammatically shows an embodiment of our invention as applied to a system for supplying a current of relatively large magnitude to a load circuit from an alternating current supply circuit through an interposed electric valve means and a transformer, and Figs. 2 to 6, inclusive, represent certain operating characteristics thereof.

In Fig. 1 of the accompanying drawings our invention is diagrammatically illustrated as applied to an electric valve translating system for supplying unidirectional current of relatively large magnitude to a load circuit 1, such as a welding circuit, from an alternating current supply circuit 2. A suitable inductive device, such as a transformer 3 having a primary winding 4 and a secondary winding 4' is energized from the alternating current circuit 2 through an electric valve means 5, preferably of the type employing an ionizable medium such as a gas or a vapor. The electric valve means 5 may include an anode 6, a mercury pool cathode 7 and a control member 8 which may be of the immersion-ignitor type, that is, may be of a type employing a material such as boron-carbide or silicon-carbide having a specific electrical resistivity substantially greater than that of the associated mercury pool cathode 7. The electric valve means 5 and the primary winding 4 are connected to the alternating current supply circuit 2 and are connected in series relation with each other through conductors 9, 10 and 11.

In order to prevent reversal of current in the secondary winding 4' and in the associated load circuit 1 after the period of energization effected by the electric valve means 5, we employ a circuit 12 which supplies unidirectional current to the primary winding 4 of transformer 3 prior to the period of energization and in the opposite direction to that supplied by electric valve means 5. The circuit 12 may comprise a second electric valve means 13 connected reversely in parallel with electric valve means 5 through a resistance 14 and a conductor 15. Electric valve means 13 is preferably of the type employing an ionizable medium, such as a gas or a vapor, and includes an anode 16, a cathode 17 and a control member 18.

We provide an excitation circuit 19 for energizing control member 8 of electric valve means 5 to render the electric valve means 5 conductive during one positive half cycle of voltage of the alternating current supply circuit 2. The excitation circuit 19 comprises a source of direct current as indicated by the conductors 20, a capacitance 21 and a resistance 22 connected in parallel with the capacitance 21. A parallel connected capacitance 23 and a voltage controlling device 24, which may be a glow discharge valve of the gaseous type, are connected in series relation with the parallel connected capacitance 21 and resistance 22. The capacitance 21 is charged from the supply circuit 2 during positive half cycles of voltage thereof through a circuit including an autotransformer 25, a unidirectional conducting device 26, a serially connected resistance 27 and the glow discharge valve 24. The capacitance 23 is also charged from the supply circuit 2 through the autotransformer 25, resistance 27, unidirectional conducting device 26 and the resistance 22. The glow discharge valve 24 serves to maintain the voltage appearing across the capacitance 23 at a substantially constant value. While for the purpose of illustrating our invention we have chosen to use a glow discharge valve for maintaining the potential across the capacitance 23 substantially constant, it should be understood that we may employ other suitable devices capable of maintaining a predetermined voltage across the capacitance 23. The excitation circuit 19 also includes an electronic discharge device 28, preferably of the type employing an ionizable medium such as a gas or a vapor, and includes an anode 29, a cathode 30 and a control electrode 31, which discharges the capacitance 21 to effect energization of the control member 8 of electric valve means 5 through an inductive device 32 at a predetermined time established by one of the associated circuits described hereinafter. The inductive device 32 may be a transformer of the type having a primary winding 33 which is connected in series relation with the electronic discharge device 28 and the capacitance 21 and having a secondary winding 34 which is connected across control member 8 and cathode 7 of electric valve means 5. A suitable impedance element such as a capacitance 31' is connected across cathode 30 and control electrode 31 of electronic discharge device 28 to cooperate with the control circuit described hereinafter to control the voltage impressed on control electrode 31. The capacitance 31' also serves to absorb extraneous transient voltages which may exist in the circuit.

As an agency for controlling the conductivity of the electronic discharge device 28 to render electric valve means 5 conductive and to effect thereby control of the energization of the load circuit 1 through the transformer 3, we provide a control circuit 35. The control circuit 35 is connected across the cathode 30 and the control electrode 31 of electronic discharge device 28 and includes a source 36 of negative unidirectional biasing potential of substantially constant value supplied by capacitance 23 and glow discharge valve 24, an impedance element such as a resistance 37 and means, such as a transformer 38, for introducing in the circuit a periodic or alternating voltage. The transformer 38 may be of the type designed to provide an alternating voltage of peaked wave form to control the time at which the electronic discharge device 28 is rendered conductive. Transformer 38 may include a primary winding 39 and a secondary winding 40, the primary winding 39 being connected to the alternating current supply circuit 2 through a resistance 41. It will be understood that a separate source of current for transformer 38 may be employed if desired. The impedance element or resistance 37 is provided with terminal connections 42 and 43 and a connection 44 electrically intermediate said terminal connections. In series relation across the resistance element 37 we provide a capacitance 45 and a suitable circuit controlling means 46 having stationary contacts 47 and 48 and a manually operable movable contact member 49. By virtue of the circuit controlling means 46 there is provided an arrangement for controlling the component of the voltage of peaked wave form which is impressed on control electrode 31 which thereby serves to control the conductivity of the electronic discharge device 28. The circuit 35 is arranged so that the maximum value of the voltage of peaked wave form introduced in the circuit by transformer 38 is substantially greater than the negative unidirectional biasing potential, so that when the movable contact member 49 of the circuit controlling means 46 is moved to engage the stationary contact 47, there is impressed on the control electrode 31 of electronic discharge 28 a voltage substantially positive relative to the cathode 30 to render the electronic discharge device conductive.

To control the electronic discharge device 28 and to control the associated electric valve means 5 so that the load circuit 1 is supplied with unidirectional current during only one half cycle of voltage of supply circuit 2, we provide an arrangement such as an inductive device or transformer 50 for charging the capacitance 45 to introduce in the control circuit 35 a voltage to maintain the electronic discharge device 28 nonconductive for a predetermined interval of time after the period of energization of the transformer 3. The transformer 50 may include a primary winding 51 which is energized in accordance with an electrical condition of an associated circuit or in accordance with an electrical condition of the transformer 3 such as the voltage of the primary winding 4, and a secondary winding 52 which introduces in the excitation circuit 35 a voltage to charge the capacitance 45, thereby establishing in the excitation circuit a negative biasing voltage of predetermined period to render ineffective the alternating voltage of peaked wave form introduced in the circuit 35 by the transformer 38.

A control circuit 53 is provided to control the conductivity of electric valve means 13 to supply unidirectional current to primary winding 4 of transformer 3 to magnetize the transformer 3 in an opposite direction to that effected by the electric valve means 5. Since the electric valve means 13 is connected reversely in parallel with the electric valve means 5, the former will supply unidirectional current to winding 4 during negative half cycles of voltage of the alternating current circuit 2. The control circuit 53 includes a suitable arrangement, such as a transformer 54, for energizing the control member 18 of electric valve means 13 to render the latter conductive during negative half cycles of voltage of supply circuit 2. The transformer 54 may be connected to the supply circuit 2 through the conductor 11, conductors 55, 56 and conductor 9 to render electric valve 13 conductive during negative half cycles of voltage of the supply circuit 2. The upper portion of secondary winding 57 of transformer 54 is shown as supplying heating current for the cathode 17 of electric valve 13, and another portion of the secondary winding may be employed to impress a suitable periodic control voltage on control member 18 of electric valve 13. A parallel connected resistance 58 and a capacitance 59 may be connected in series relation with the lower portion of the secondary winding 57 of transformer 54 and control member 18 to operate as a self-biasing type of control circuit. We provide an inductive device or a transformer 60 which may be energized in accordance with an electrical condition of an associated circuit or the transformer 3, such as the voltage of primary winding 4, for charging the capacitance 59 to introduce in control circuit 53 a voltage to maintain the electric valve 13 nonconductive for a predetermined interval of time after the period of energization of transformer 3 is effected by electric valve means 5. The transformer 60 may comprise a primary winding 61 which is connected across the primary winding 4 of transformer 3 through conductors 55, 62, 10 and 63, and a secondary winding 64 which is connected in series relation with the lower portion of secondary winding 57 of transformer 54 and the self-biasing arrangement including resistance 58 and capacitance 59.

The operation of the embodiment of our invention diagrammatically shown in Fig. 1 may be best understood by considering the operation of the system prior to the energization of the load circuit 1 by the electric valve means 5. Electric valve 13 will be rendered conductive during negative half cycles of voltage of circuit 2 to supply unidirectional current to primary winding 4 of transformer 3. The control circuit 53 impresses a suitable alternating voltage on control member 18 of electric valve 13, the transformer 54 being connected to circuit 2 through conductors 9, 56, 55 and 11. The magnitude of this current may be controlled to effect substantial saturation of the core member of transformer 3, if desired. Normally, during the positive half cycles of voltage of the supply circuit 2, electric valve means 5 will be maintained nonconductive by virtue of the fact that electronic discharge device 28 is maintained nonconductive. Control circuit 35 maintains electronic discharge device 28 nonconductive due to the negative unidirectional biasing potential introduced therein by the capacitance 23 and the glow discharge valve 24. The excitation circuit 19, of course, will be energized from the supply circuit 2 through the unidirectional conducting device 26 to establish positive charges on the upper plates of the capacitances 21 and 23. Since the value of the resistance 37 has been chosen to reduce the resultant or net voltage of peaked wave form impressed on control electrode 31 when the movable contact member 49 is in the position shown in Fig. 1, the electronic discharge device 28 will be maintained nonconductive. By virtue of this correlation of elements under these conditions the component of voltage of peaked wave form impressed on control electrode 31 will be less than the negative unidirectional biasing potential provided by the capacitance 23, thereby maintaining the electronic discharge device 28 nonconductive. If it is desired to effect energization of the transformer 3 to supply a large unidirectional current to the load circuit 1, the movable contact member 49 of circuit controlling means 46 may be moved to engage contact 47 to effect an increase in the positive value of voltage of peaked wave form impressed on control electrode 31. When the circuit controlling means 46 is so operated, the increase in voltage effected in the control circuit 35 will establish an increase in voltage across the capacitance 31' and hence will establish an increase in voltage across control electrode 31 and cathode 30. By selecting capacitance 45 to be materially larger than capacitance 31', the voltage appearing across capacitance 31' may be made to increase by a substantial amount. Since the magnitude of the voltage of peaked wave form now impressed on control electrode 31 is substantially greater than the magnitude of the negative unidirectional biasing potential, the electronic discharge device 28 will be rendered conductive, permitting discharge of the capacitance 21 through primary winding 33 of transformer 32. By virtue of this discharge of capacitance 21 the control member 8 of electric valve means 5 will be supplied with current to energize primary winding 4 of transformer 3 during a positive half cycle of voltage of supply circuit 2. Since it is desired to supply only one pulse of unidirectional current to the load circuit 1, transformer 50, which is responsive to the voltage of primary winding 4 of transformer 3 introduces in control circuit 35 a voltage to establish a negative charge on the right-hand plate of capacitance 45 which in turn impresses on control electrode 31 a negative unidirectional biasing potential of sufficient magnitude and duration to render ineffective the voltage of peaked wave form for a predetermined interval of time after the energization of primary winding 4, even though the movable contact member 49 of circuit controlling means 46 is maintained in engagement with contact 47. The capacitance 45, of course, will discharge at a rate dependent upon the time constant of the associated circuit including resistance 37, which time constant controls the period for which the electronic discharge device 28 is maintained nonconductive after the energization of transformer 3.

The control circuit 53 associated with electric valve means 13 operates to maintain electric valve 13 nonconductive for a predetermined interval of time after the energization of primary winding 4 by electric valve means 5. Since primary winding 61 of transformer 60 is energized in accordance with the voltage of primary winding 4, the voltage appearing across this winding during the period of energization by electric valve means 5 will introduce in control circuit 53 a voltage to maintain electric valve 13 nonconductive for a predetermined interval of time due to the operation of the self-biasing circuit including resistance 58 and capacitance 59. The interval of time for which the electric valve means 13 is maintained nonconductive will, of course, depend upon the time constant of the self-biasing circuit including resistance 58 and capacitance 59. The control circuits 35 and 53 may be proportioned so that the load circuit may be opened and the work removed without subjecting the work to the reversal of current in the load circuit 1 when the valve 13 again becomes conductive.

Figure 2:
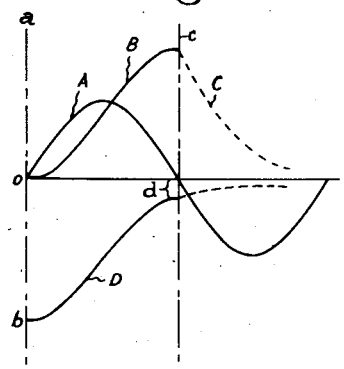
Figure 3:
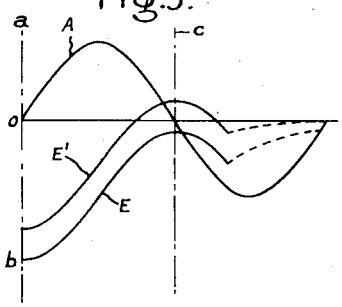

Some of the principal advantages of our invention may be better understood by considering the operating characteristics represented in Figs. 2 and 3. Curve A of Figs. 2 and 3 represent the alternating voltage of supply circuit 2. Curve B of Fig. 2 represents the flux which would be established in the core member of transformer 3 if the core were not pre-magnetized or pre-saturated by the electric valve means 13. The dotted curve C of Fig. 2 represents the decay of flux in the core member of transformer 3 and represents the flux which would cause a flow of current in the reverse direction in the secondary winding 4' or the load circuit 1. If at a time $a$ the transformer 3 is magnetized in the reverse direction by electric valve means 13 so that there exists at that time a magnetic flux of a magnitude $ob$, as represented by curve D of Fig. 2, the energization of the transformer 3 by electric valve means 5 will effect a change in the flux of the core of transformer 3 corresponding to the curve D. At the time $c$ it will be noted that the amount of flux in the core member of transformer 3 is relatively small corresponding to the value $d$. By the proper arrangement of the circuit, it is clear that the pre-magnetization of the electric valve means 13 may be adjusted to establish a flux in the core member so that after the period of energization of electric valve means 5 the flux remaining in the core of transformer 3 is of the same polarity as that present at the beginning of the conducting interval, thereby preventing reversal of current in the secondary winding 4'. Curve E of Fig. 3 represents the resultant flux in the core member of transformer 3 for an inductive load when the transformer 3 is pre-magnetized by electric valve 13 and when the magnitude of the initial flux is sufficiently great to maintain the flux of the same polarity during the entire operation. It will be noted that the polarity of the flux at the end of the conducting interval is of the same polarity as the initial flux. Curve E' of Fig. 3 represents the resultant flux in the core member of transformer 3 for an inductive load when the initial flux is of a smaller value than that represented by curve E. It will be noted, however, that by virtue of the inductive load cooperating with the inductance of the transformer, the flux during the decaying period is of the same polarity as the initial flux so that no reversal of current in the secondary is produced.

Figure 4:
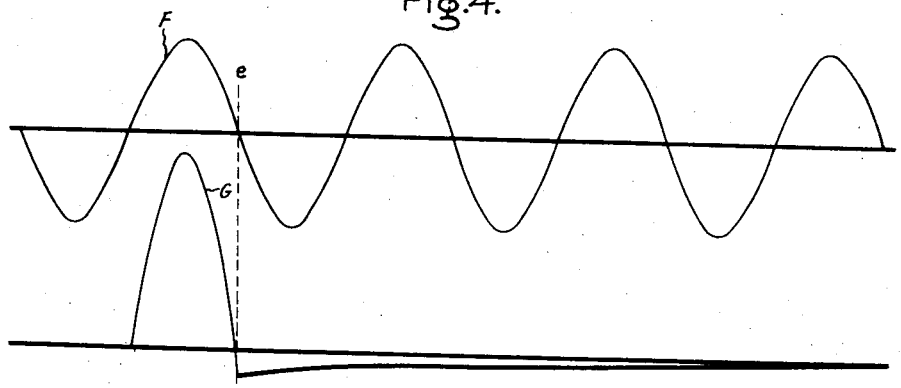
Figure 5:
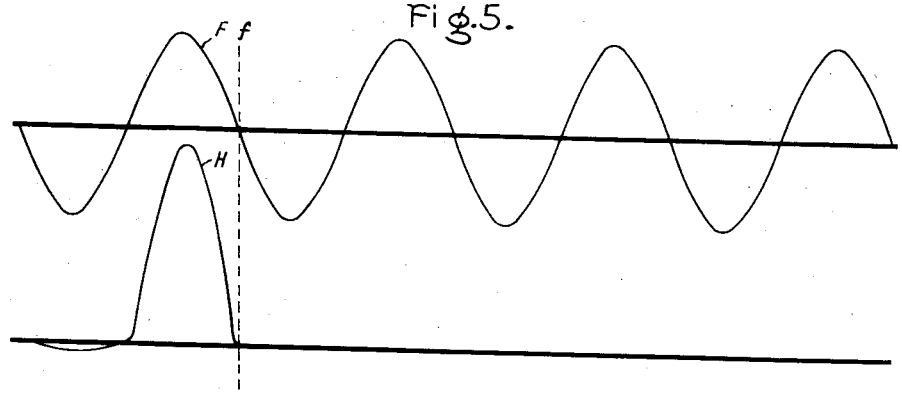
Figure 6:
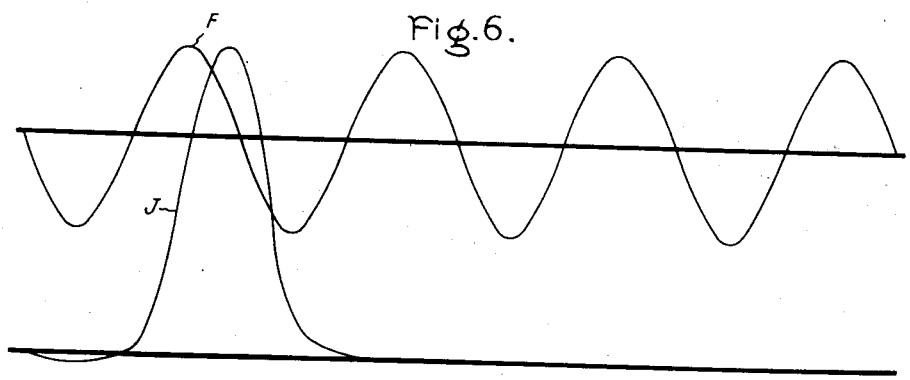

Referring to Figs. 4, 5 and 6, curve F represents the alternating voltage of the supply circuit 2. Curve G of Fig. 4 represents the current in secondary winding 4' or the current in the load circuit 1 when the transformer 3 is not pre-magnetized or pre-saturated. It will be noted that at the time $e$ there is a reversal of current in the secondary winding which exists for an appreciable length of time and which may be undesirable in certain applications where it is expedient to employ only unidirectional currents of relatively large value. Curve H of Fig. 5 represents the current in secondary winding 4' of transformer 3 when the electric valve 13 has effected pre-magnetization of the transformer 3 in an opposite direction during the negative half cycle immediately preceding the positive half cycle of conduction by electric valve 5. It will be noted that at the time corresponding to the position of line $f$, the secondary current falls to zero but does not reverse in direction. In Fig. 6 the curve J represents the current in secondary winding 4' of transformer 3 when an inductive load is supplied and when the primary winding 4 has been pre-magnetized by electric valve 13 during the preceding negative half cycle. In this instance it will also be noted that there is no reversal of the secondary current at the end of the period of energization by electric valve 5.

While we have shown and described our invention as applied to a particular system of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In combination, a source of current, an inductive device, a load circuit connected to said device, means connected between said source and said inductive device for supplying unidirectional current to said device during a predetermined interval of time, and means for energizing said device prior to and in the direction opposite to that effected by said first mentioned means to prevent reversal of current in said load circuit upon interruption of said unidirectional current.

2. In combination, a source of alternating current, a transformer having a primary winding and a secondary winding, an electric valve means connected to energize said primary winding from said source, a second electric valve means connected between said source and said primary winding to magnetize said transformer prior to and in a direction opposite to that effected by said first mentioned electric valve means to establish in said transformer a flux of sufficient magnitude to prevent reversal of current in said secondary winding after said first mentioned electric valve means becomes nonconductive.

3. In combination, a source of alternating current, a transformer having a primary winding and a secondary winding, an electric valve means connected in series relation with said source and said primary winding, a second electric valve means connected reversely in parallel with said first mentioned electric valve means, means for rendering said second valve means conductive during half cycles of predetermined polarity of voltage of said source, and means for rendering said first mentioned electric valve means conductive during a single half cycle of voltage of opposite polarity and for maintaining said second valve means nonconductive for a predetermined interval of time after said single half cycle.

4. In combination, a source of alternating current, a transformer having a primary winding and a closed secondary winding, an electric valve means for energizing said primary winding during a single positive half cycle of voltage of said source, a second electric valve means for energizing said primary winding in the reverse direction during the negative half cycle of voltage of said source immediately preceding said single positive half cycle of conduction of said first mentioned means to prevent reversal of the current in said secondary winding when said first mentioned electric valve means becomes nonconductive, and means for maintaining said second electric valve means nonconductive for a predetermined interval of time after said first mentioned electric valve means becomes nonconductive.

5. In combination, a source of alternating current, a transformer having a primary winding and a closed secondary winding circuit, an electric valve means interposed between said source and said primary winding for energizing said primary winding during a single positive half cycle of applied voltage, and means comprising a second electric valve means for magnetizing said transformer in the opposite direction during the negative half cycle immediately preceding said positive half cycle of conduction of said first mentioned electric valve means to prevent a reversal of the current in said secondary winding when said first mentioned electric valve means becomes nonconductive.

6. In combination, a source of alternating current, a transformer having a primary winding and a closed secondary winding circuit, an electric valve means connected in series relation with said source and said primary winding, means for rendering said electric valve means conductive to conduct current during a positive half cycle of applied voltage, and means including a second electric valve means connected reversely in parallel with said first mentioned electric valve means to magnetize said transformer prior to said positive half cycle and in the opposite direction to that effected by said first mentioned electric valve means to prevent the reversal of current in said secondary winding when said first mentioned electric valve means becomes nonconductive.

7. In combination, an alternating current supply circuit, a load circuit, a transformer including a primary winding and a secondary winding connected to said load circuit, an electric valve means interposed between said supply circuit and said primary winding of said transformer for supplying unidirectional current thereto, a second electric valve means interposed between said supply circuit and said primary winding for energizing said primary winding in a direction opposite to that effected by said first mentioned electric valve means, a control circuit for energizing said first mentioned electric valve means to render said valve conductive during only one half cycle of alternating voltage, and a control circuit for said second electric valve means for energizing said primary winding in the reverse direction preceding said half cycle and for maintaining said second valve means nonconductive for a predetermined interval of time after said half cycle.

8. In combination, an alternating current supply circuit, a load circuit, a transformer including a primary winding and a secondary winding connected to said load circuit, an electric valve means having a control member and being connected in series relation with said supply circuit and said primary winding for supplying unidirectional current thereto, an excitation circuit comprising a source of direct current and an electronic discharge device, means for controlling said discharge device to energize said control member from said direct current source, and means for maintaining said discharge device nonconductive for a predetermined interval of time after said electric valve means has effected energization of said primary winding.

9. In combination, an alternating current supply circuit, a transformer having a primary winding and a closed secondary winding, an electric valve means having a control member and being connected in series relation with said supply circuit and said primary winding for supplying unidirectional current thereto during a single half cycle of voltage of said supply circuit, an excitation circuit for energizing said control member comprising a source of direct current, a capacitance connected to be charged from said source and an electronic discharge device for discharging said capacitance to energize said control member and having a control electrode, a control circuit for energizing said control electrode to control the conductivity of said electronic discharge device, and means responsive to an electrical condition of said primary winding for introducing in said control circuit a biasing voltage to maintain said electronic discharge device nonconductive for a predetermined interval of time after said half cycle.

10. In combination, an alternating current supply circuit, a load circuit, a transformer having a primary winding and a secondary winding connected to said load circuit, an electric valve means connected in series relation with said supply circuit and said primary winding, a second electric valve means connected reversely in parallel with said first mentioned electric valve means, a control circuit for rendering said first mentioned electric valve means conductive during only one positive half cycle of alternating voltage of said supply circuit, a control circuit for rendering said second electric valve means conductive during the negative half cycle of alternating voltage immediately preceding said positive half cycle so that only unidirectional current is supplied to said load circuit, and means associated with said control circuits for maintaining said first mentioned electric valve means and said second electric valve means nonconductive for a predetermined interval of time after said positive half cycle.

11. In combination, an electronic discharge device having an anode, a cathode and a control electrode, an impedance element connected across said cathode and said control electrode, a control circuit connected across said cathode and said control electrode and being connected in parallel with said impedance element and comprising a source of negative unidirectional biasing potential of substantially constant value, means for introducing in said control circuit a periodic voltage having a magnitude substantially greater than that of said biasing potential and a second impedance element connected in series relation with said source and said means, and means for controlling the impedance of said second impedance element to control the component of said periodic voltage impressed on said control electrode for effecting control of the conductivity of said electronic discharge device.

12. In combination, an electronic discharge device having an anode, a cathode and a control electrode, an impedance element connected across said cathode and said control electrode, a control circuit connected across said cathode and said control electrode and being connected in parallel with said impedance element and comprising a source of negative unidirectional biasing potential, means for introducing in said control circuit a voltage of peaked wave form and a resistance element connected in series relation with said source of biasing potential and said means, and means connected across said resistance element for varying the resistance of said element to control the component of said voltage of peaked wave form impressed on said impedance element to control said electronic discharge device.

13. In combination, an electronic discharge device having an anode, a cathode and a control electrode, an impedance element connected across said cathode and said control electrode, a control circuit connected across said cathode and said control electrode and being connected in parallel with said impedance element and comprising a source of negative unidirectional biasing potential, means for introducing in said control circuit an alternating voltage of peaked wave form having a maximum value substantially greater than the magnitude of said biasing potential and a second impedance element connected in series with said source and said means, and controlling means for controlling the value of said second impedance element to control the component of said voltage of peaked wave form impressed on said control electrode to render selectively conductive and nonconductive said electronic discharge device.

14. In combination, an electronic discharge device having an anode, a cathode and a control electrode, a capacitance connected across said cathode and said control electrode, a control circuit connected across said cathode and said control electrode comprising a source of unidirectional negative biasing potential, means for introducing in said circuit a voltage of peaked wave form having a maximum value substantially greater than the magnitude of said biasing potential and a resistance connected in series relation with said source and said means and having a pair of terminal connections and a connection electrically intermediate said terminal connections, a controlling device connected through a second capacitance to one terminal of said resistance and arranged to engage selectively the other terminal and the intermediate connection to control the component of said voltage of peaked wave form impressed on said control electrode to effect control of the conductivity of said electronic discharge device.

15. In combination, an electronic discharge device having an anode, a cathode and a control electrode, an impedance element connected across said cathode and said control electrode, a source of alternating current, means for providing a negative unidirectional biasing potential comprising a capacitance, a glow discharge valve connected in parallel with said capacitance and a unidirectional conducting device connected in series relation with said parallel-connected capacitance and glow discharge valve for charging said capacitance from said source, and a control circuit for energizing said control electrode including a source of alternating voltage and a second impedance element connected in series relation with said source of alternating voltage and said parallel-connected capacitance and glow discharge valve, and means for controlling said second impedance element to control the conductivity of said electronic discharge device.

16. In combination, an electronic discharge device having an anode, a cathode and a control electrode, a capacitance connected across said cathode and said control electrode, a control circuit connected across said cathode and said control electrode comprising a source of negative unidirectional biasing potential of substantially constant value, means for introducing in said control circuit an alternating voltage, having a maximum value substantially greater than that of said biasing potential and an impedance element connected in series relation with said source and said means, a serially connected control means and a capacitance connected across said impedance element to control the component of said alternating voltage impressed on said control electrode for effecting control of the conductivity of said electronic discharge device, and means responsive to a predetermined electrical condition for charging said last mentioned capacitance to introduce in said control circuit a second negative unidirectional biasing potential to render ineffective said alternating voltage for a predetermined interval of time after the occurrence of said electrical condition.

17. In combination, an electronic discharge device having an anode, a cathode and a control electrode, a control circuit connected across said cathode and said control electrode comprising in series relation a source of negative unidirectional biasing potential, means for providing an alternating voltage of peaked wave form, an impedance element and a transformer having a secondary winding for introducing in said excitation circuit a voltage in accordance with a predetermined electrical condition and means connected in parallel with said impedance element comprising a serially-connected circuit controlling device and a capacitance, said capacitance being connected to said secondary winding and arranged to be charged by said transformer upon the occurrence of said electrical condition to introduce in said control circuit a second negative biasing potential to maintain said electronic discharge device nonconductive for a predetermined interval of time after the occurrence of said electrical condition.

HAROLD W. LORD.
THEODORE M. DICKINSON.